United States Patent [19]

McArthur

[11] Patent Number: 5,464,104
[45] Date of Patent: Nov. 7, 1995

[54] MOBILE STORAGE RACK FOR CONTAINERS

[76] Inventor: Jim McArthur, 79 Mill Stone, San Jose, Calif. 95136

[21] Appl. No.: 171,700

[22] Filed: Dec. 22, 1993

[51] Int. Cl.⁶ ....................................... A47F 5/00
[52] U.S. Cl. ................ 211/133; 280/47.19; 280/79.3
[58] Field of Search ................ 280/47.19, 79.3; 211/71, 126, 133

[56] References Cited

U.S. PATENT DOCUMENTS

| | | | |
|---|---|---|---|
| 2,901,261 | 8/1959 | Olvey | 280/47.19 X |
| 3,494,631 | 2/1970 | Kreider | 280/47.19 |
| 3,734,526 | 5/1973 | Propst et al. | 280/79.3 X |
| 3,804,432 | 4/1974 | Lehrman | 280/47.19 X |
| 3,908,831 | 9/1975 | Brendgord | 280/79.3 X |
| 4,037,851 | 7/1977 | Romero | 280/79.3 |
| 4,363,496 | 12/1982 | Schreiner | 211/126 X |
| 5,160,154 | 11/1992 | Seydel et al. | 280/47.19 |

*Primary Examiner*—Robert W. Gibson, Jr.
*Attorney, Agent, or Firm*—Jim F. McArthur

[57] ABSTRACT

A mobile storage rack for containers that is a free standing vertical frame, the frame has support hooks that containers mount on. Containers mount vertically above each other. The support hook allows bins to hang in a fashion that creates an increased access space between lower bins. The base has an axle and a pair of wheels that allows the rack fully loaded to be moved. The base also has two stabilizing legs that allows frame to be free standing and any load on support hooks is transferred to the stabilizing legs. Mounted on the opposite side of frame are two brackets that hold flat rigid material such as cardboard.

2 Claims, 1 Drawing Sheet

MOBILE STORAGE RACK FOR CONTAINERS

BACKGROUND

1. Field of Invention

This invention relates to the useful accessible storage and transfer of containers.

2. Discussion of Prior Art

The present invention relates to the storage and transfer of containers used for storage of recyclable materials.

The problem of trash collection and disposal is becoming a huge burden to this country, in regards to landfills and dumps becoming filled to capacity. State County and City authorities are faced with waste management decisions.

One popular solution is recycling. Many cities provide individual residences with recycling containers for dividing and separating different categories of trash. These containers are to be loaded with materials such as plastic, glass, aluminum cans, junk mail, paper, cardboard, etc. When filled, the containers need to be moved to the pick up spot where the authorities empty the containers. Then the containers are returned to a storage spot and filled again.

However, nothing is provided to store the containers or to transfer them to and from the pick up spot.

People are finding out that the containers use a lot of space when stored side by side, and they are inaccessible when stacked on top of each other. In addition, they are very cumbersome to move when filled.

Thereafter, inventors have developed several types of "container carts" and "trash container supporting apparatus". These developments failed to make a cart that is compatible with many different styles, shapes and sizes of containers, including the type of container issued by the city. They are limited in use to one particular container.

U.S. Pat. No. 4,984,704 issued to James O'Malley of Glassboro, N.J., Aug. 18, 1989 for "Trash container supporting apparatus" is useful in that it stored a plurality of trash containers. The apparatus is designed around and limited to use with one type and size of trash container. The apparatus is also clumsy and awkward to move. The severe angle of the container when resting in a vertical position limits the capacity of each container. The vertical position is the most economical position for spacesaving. In the horizontal position it uses too much space and would be very costly to manufacture.

"The Cart for Recycling Container" is U.S. Pat. No. 332,335 issued to Lisa A. Cassad of Eastsummer, Wash., on Apr. 15, 1991. This patent is once again limited in use to one type and size of container. If any other trash container fits on the cart, which it may, it would be totally inaccessible because of the design. The design is to have the containers stack directly on top of each other. Both prior arts seem to limit themselves to containers only for recycling.

OBJECTS AND ADVANTAGES

Several objects and advantages of the present invention are:

(a) To provide a space saving storage rack for recycling bins or containers that can be moved easily from a storage location to a pick up spot.

(b) To fashion the storage of containers so they can be accessed for loading, without needing to move them, or shuffle container to container for access.

(c) To provide a practical means of storage for broken down cardboard boxes, etc.

(d) To have the entire unit stow up against the wall with minimal space requirements and/or space lost while being freestanding.

(e) To provide a storage rack to be used with many different sizes and styles of containers.

(f) To provide a simple means of mounting and dismounting said container to the mobile storage rack for containers.

(g) To provide a simple design so manufacturing cost will be minimal and raw materials used will be minimal.

(h) To provide a racking system that will allow containers to pivot in place, increase accessible space and lower the containers if necessary. (By design the access space is large enough for most needs.)

(i) To provide a free standing rack that is stable and safe even when loaded to capacity and not likely to tumble or fall when the load is not balanced. It should withstand reasonable knocking or bumping.

(j) To provide a storage rack for containers that can be used by industry.

Further objects and advantages are to provide a recycling container storage rack that can be easily and conveniently used and stored with minimum use of space. While being stored the rack must allow easy, ample access to each container. The storage rack will also be movable from storage spot to and from the pick up spot with relative ease. The rack will be inexpensive to manufacture and many different styles and sizes of containers can be used with the rack. Still further objects and advantages will become apparent from a consideration of the ensuing description and drawings.

LIST OF REFERENCE NUMBERS

10—The whole unit "Mobile Storage Rack for Containers"
11—Frame
12A—Support Hooks
12B—Support Hooks
13A—Support Hooks
13B—Support Hooks
14A—Support Hooks
14B—Support Hooks
15A—Stabilizing Legs
15B—Stabilizing Legs
16A—Rubber Feet
16B—Rubber Feet
17A—Material Hooks
17B—Material Hooks
18—Axle
19A—Wheels
19B—Wheels
20A—Vertical Distance Between Support Hooks (#12A,

B/#13A,B)

20B—Vertical Distance Between Support Hooks

21—Open Angle to Allow Material to be Loaded

22—Predetermined Angle or Gap that Allows Containers to Hang at a Slight Angle Allowing Greater Access to Lower Containers

23A—Container Shown in Use with Mobile Storage Rack for Containers

23B—Container Shown in Use with Mobile Storage Rack for Containers

23C—Container Shown in Use with Mobile Storage Rack for Containers

24—Material Shown in Use with #17A&B

25A—Access Space

25B—Access Space

DESCRIPTION AND OPERATION OF INVENTION

Figure 1:
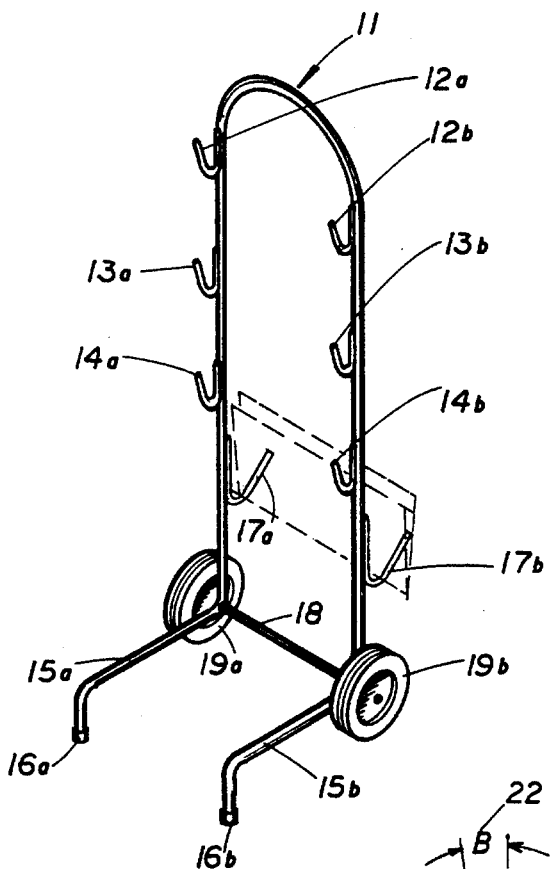
FIG. 1 is a perspective view of my invention.
Figure 2:
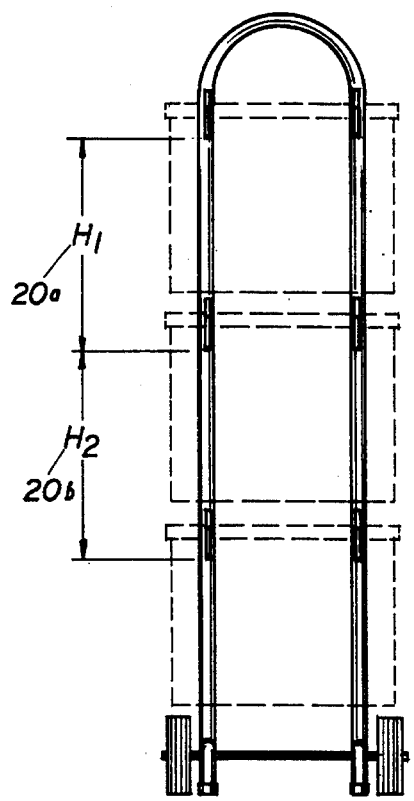
FIG. 2 is a rear view drawing of my invention with containers in place.
Figure 3:
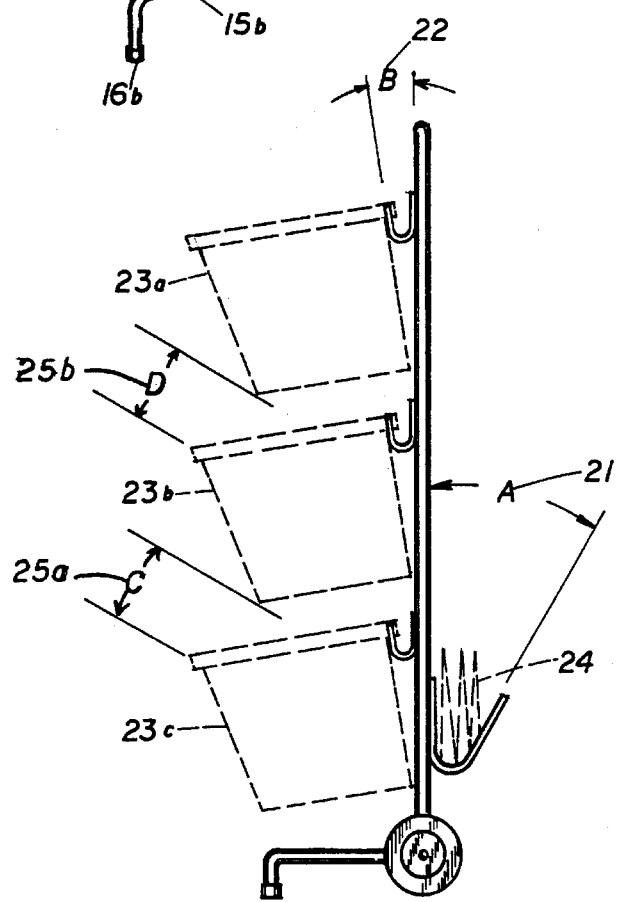
FIG. 3 is a side view with containers in place.

FIG. 1 shows a basic version of my invention which I call a "mobile storage rack for containers" specifically but not limited to recycling containers. FIG. 1 shows a round tube, frame (#11) in a simple inverted "u" configuration. In a vertical position the said frame is equipped with an axle assembly at a base that consists of two wheels (#19A) and (19B) and an axle (#18). Protruding horizontally from the frame, at an axle are two stabilizing legs (#15A) and (#15B). Mounted on the ends of each stabilizing leg are rubber feet (#16A) and (#16B). The said stabilizing legs and rubber feet act together with the wheels and axle to create a sturdy, stable base, which allows the frame (#11) to be free standing and mobile.

Mounted on the vertical portion of a said frame (#11) are support hooks (#14A) and (#14B). The support hooks are a series of two hooks mounted at equal heights and designed to hold one container (#23C). A second series of support hooks (#13A) and (#13B) are mounted above the first set. These work together in the same fashion as the first. A third series of support hooks (#12A) and (#12B) are mounted above the second set, with the possibility of additional hooks above them. These support hooks allow for many different size and styles of containers to be mounted and dismounted easily from the storage rack. The said support hooks allow the containers to hang at a slight angle which provides greater access space between containers (#25A) and (#25B). The support hooks will allow the containers to pivot in place to create an even larger access for loading.

On the opposite side of the frame (#11) above the wheel and below the first hooks (#14A) and (#14B) are a set of material hooks (#17A) and (#17B). These material hooks are used to store different or larger types of material such as cardboard.

The said frame is a simple design to maintain low manufacturing cost and provide the greatest strength and stability. The base which is made up of two wheels and two stabilizing legs with rubber feet allow the storage rack to be free standing. The wheels provide a means of easy transportation which will allow a plurality of containers that are filled to capacity and a bundle of cardboard to be stored and then moved to the pick up spot with one easy trip. This will minimize the risk of injury that commonly occurs from lifting and carrying containers. The mobile storage rack for containers will also be useful to industry.

CONCLUSION, RAMIFICATIONS, AND SCOPE OF INVENTION

Thus the reader will see that the "mobile storage rack for containers" provides a highly versatile storage system that allows space saving storage and at the same time maintains total accessibility to each container. In a stationary or storage position its design proves to be strong and stable and is not likely to be knocked over regardless of how the load is balanced. The wheels then allow almost any person to transport the entire rack and load to the pick up spot in one easy safe trip while minimizing risk of injury that is commonly caused by lifting and carrying containers. This makes recycling easier, safer and less time and space consuming. This can make recycling more practical thus ensuring success.

While my above description contains many specificities, this should not be construed as limitation on the scope of the invention. But rather as exemplification of one preferred embodiment thereof. Many other variations are possible. For example: containers can be mounted on rear side to balance the load. The frame design can be modified so it may be more economically packaged, etc. Thus the scope of the invention should be determined by the appended claims and their legal equivalents rather than by the examples given.

I claim:

1. A mobile storage rack for containers comprising:

a vertical frame having two parallel vertical members with a cross member connecting the upper ends of the vertical members and forming a handle;

an axle extending between the lowermost ends of said vertical members, said axle extending beyond each said vertical member a distance sufficient to mount a wheel on the ends of said axle;

a pair of stabilizing members, mounted to the lowermost ends of each vertical member and extending parallel to one another and at right angles to said axle and said vertical members, the distal ends of each said stabilizing member, being a predetermined distance from said vertical member and terminating in a downturned portion;

said vertical frame having a plurality of mounting devices, said mounting devices attached to said vertical frame in pairs at equal predetermined heights on each said vertical member and extending from said vertical members parallel to, and in the same direction as said stabilizing members;

a pair of support brackets for holding and storing loose, rigid material, said support brackets attached to said frame member at equal predetermined heights on each said vertical member parallel to, and in the opposite direction from said stabilizing members.

2. A mobile storage rack for containers as set forth in claim 1 wherein:

said mounting devices are mounted directly over said stabilizing members, said mounting devices each having a portion attached to said vertical member and extending vertically downwardly to a portion that curves upward and away from said vertical member to an uppermost end which may engage the lipped edge of a container.

* * * * *